Patented June 18, 1935

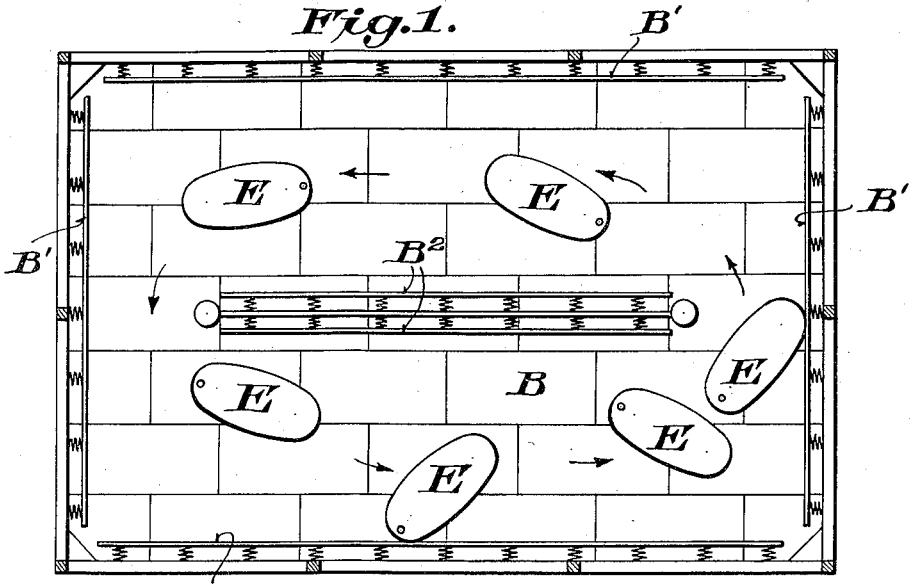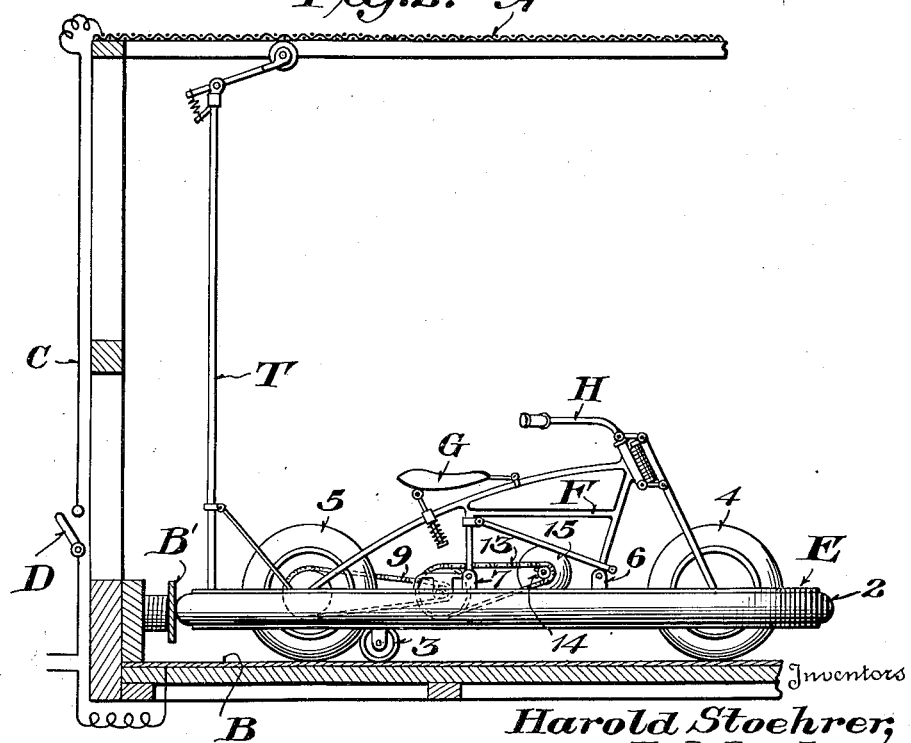

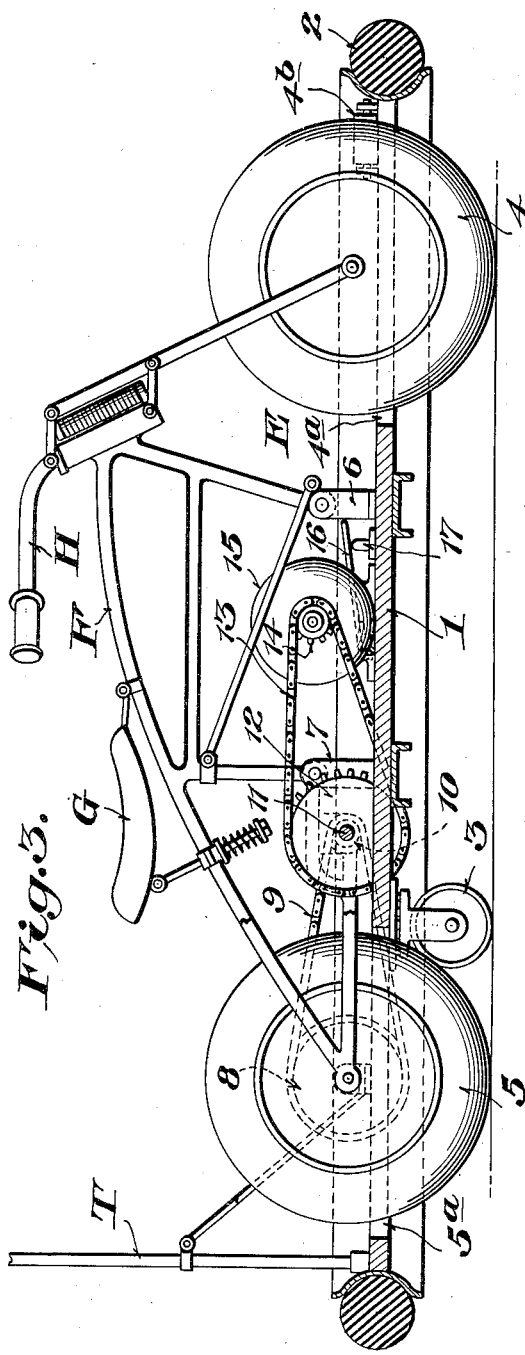
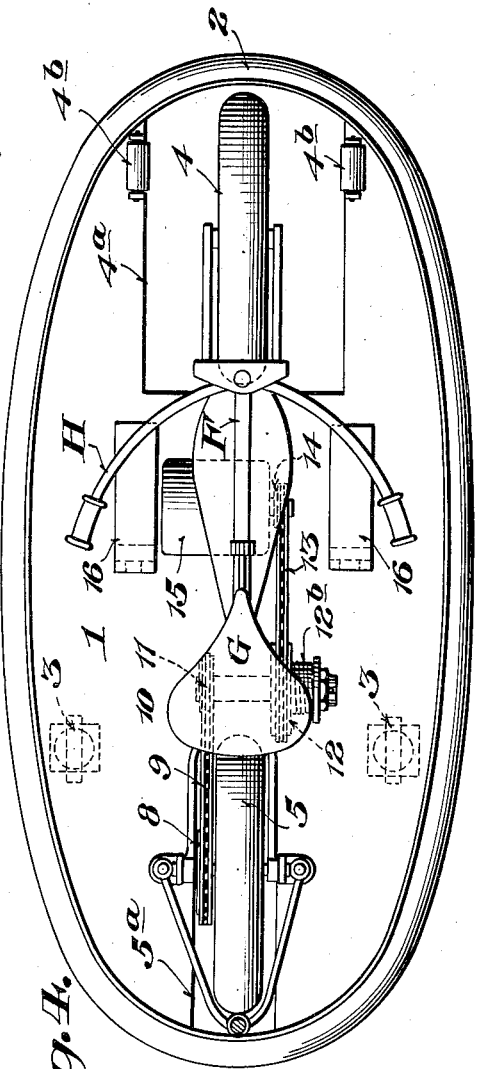
Inventors
Harold Stoehrer,
Fred L. Markey,

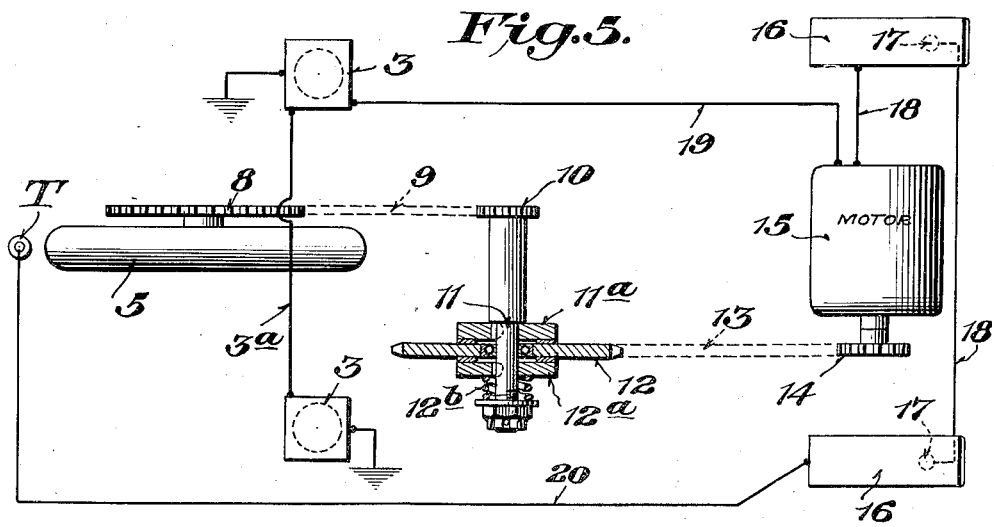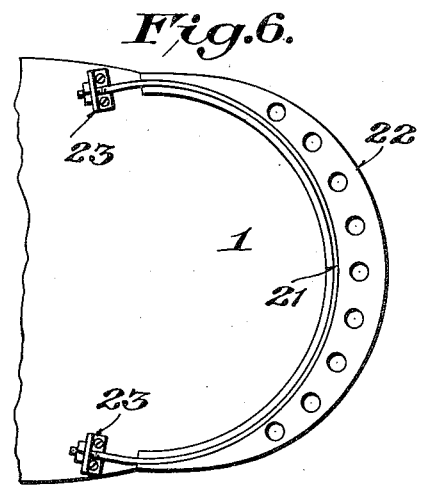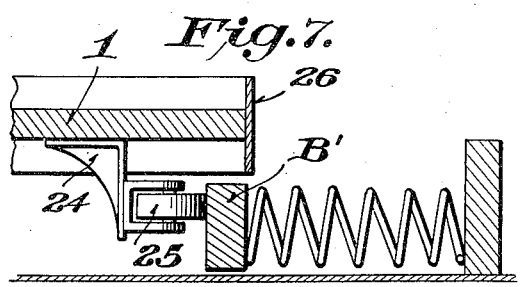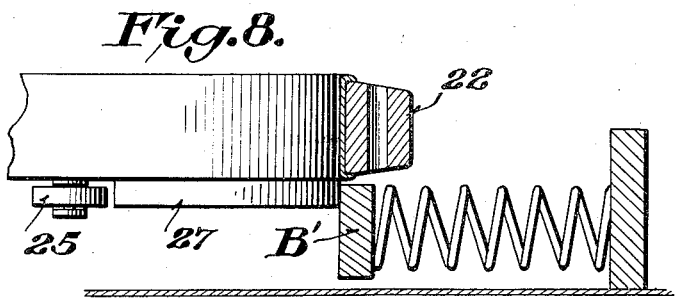

2,005,400

UNITED STATES PATENT OFFICE 2,005,400

AMUSEMENT APPARATUS

Harold Stoehrer, Manatee, Fla., and Fred L. Markey, Exeter, N. H., assignors to Dodgem Corporation, Lawrence, Mass., a corporation of Massachusetts Application January 25, 1934, Serial No. 708,320

4 Claims. (Cl. 180—2)

This invention relates to amusement apparatus of the type used at amusement parks, arcades, fairs and the like and more particularly to an improvement in the type of apparatus shown in Stoehrer et al. Patents Nos. 1,373,108; 1,467,959 and Markey Patents Nos. 1,772,220 and 1,839,981.

One of the objects of the invention is to provide an apparatus including a car or vehicle simulating a motorcycle or bicycle having the desirable characteristics of mobility, dirigibility, and safety in colliding with other vehicles or the apparatus enclosure, while at the same time creating a new interest and new sensations to users or patrons of this class of amusement devices.

A further object of this invention is to provide improved bumper features for the car which materially contribute to maintaining continuous operation of the vehicles over the floor by avoiding sticking or jamming against the bumpers at the sides of the enclosure of the apparatus, and, at the same time, preserving all of the essential safety characteristics incident to vehicle-to-vehicle collision, necessary to the successful operation of this type of apparatus.

With the above and other objects in view which will more readily appear as the nature of the invention is better understood, the invention consists in the novel features of construction, combination and arrangement of parts, hereinafter more fully described, illustrated in the accompanying drawings and defined in the appended claims.

A preferred and practical embodiment of the invention is shown in the accompanying drawings, in which:—

Figure 1 is a diagrammatic view illustrating, in plan, the enclosed floor with a center island to assist in compelling one-way traffic.

Figure 2 is a vertical sectional view of the complete apparatus showing one of the improved vehicles in side elevation.

Figure 3 is an enlarged vertical sectional view of the vehicle shown in Figure 2.

Figure 4 is a top plan view of the vehicle shown in Figure 3.

Figure 5 is a diagrammatic view illustrating the electric circuits involved.

Figure 6 is a detail bottom plan view of one end of a car platform showing a novel rubber or equivalent end-bumper.

Figure 7 is a detail sectional view illustrating a roller-type guard abutment intended for engaging with the enclosure-bumper.

Figure 8 is a detail vertical sectional view illustrating a guard flange abutment on the platform for engaging the enclosure bumper and a roller guard abutment adjacent the fixed guard abutment.

Similar reference characters designate corresponding parts throughout the several figures of the drawings:—

A distinctive feature of the present invention resides in providing a vehicle in the form of a bicycle or a motorcycle, so mounted and equipped that it may operate over the floor of the enclosure at the will of the operator by steering the same in the usual manner and through the aid of electrical switches controlled by the operator's feet to furnish power to the driving or propelling motor.

Referring to Figures 1 and 2, the ceiling is designated generally as A and the floor is indicated as B. These elements, namely the ceiling A and floor B may be included in an electrical circuit designated generally as C and controlled by the switch D. The floor B is provided at the sides thereof with a plurality of yielding bumper elements B' defining an enclosure against which the vehicles E may bump or collide in their travel. As shown in Figure 1, the central portion of the floor B is provided with bumpers B² arranged parallel to one of the sides of the enclosure, thereby to provide an "island" which has the effect of directing or promoting one-way traffic.

The vehicles E each preferably include a platform 1 which may be surrounded by a resilient bumper 2 of any desired type. The under side of the platform 1 is provided with suitable swivel casters 3 which cooperate with the front and rear wheels 4 and 5 of a bicycle or motorcycle structure designated generally as F. The casters 3 may be of metal to serve as an electrical ground or a ground shoe may be used in accordance with well known practice. The wheels 4 and 5 project through suitable openings 4ª and 5ª in the platform, the first mentioned opening being of such size, shape and form as to permit of free turning movement of the front steering wheel 4 under the influence of the handle-bars H in the customary manner. The frame of the cycle F includes an operator's seat G and the usual frame parts for receiving and mounting the wheels 4 and 5. As shown in Figure 3, for example, the cycle frame F is preferably mounted in an upright position on the upper side of the platform by means of suitable brackets 6 and 7.

The rear wheel 5 is provided with a sprocket 8 engaged by a sprocket chain 9 which in turn engages with a pinion sprocket 10 mounted on a shaft or spindle 11 which in turn carries a larger sprocket 12. The latter is connected by chain 13 with a sprocket pinion 14 of a propelling motor 15. At each side of the frame of the cycle, conveniently located on the platform with respect to the seat G, is provided a suitable foot rest or treadle 16, simulating the pedals of the cycle, the said member 16 is in each instance constituting an actuator for an electric switch element 17. The switches 17 are included in series in an electrical circuit 18 with the motor 14 as will be apparent from the diagram of Figure 5. The motor 15 is in turn grounded by the line 19 through the metallic casters 3, the latter being preferably connected by the line 3a to insure completion of the circuit in event that one or the other of the casters should be out of contact with the metallic covering of the floor B due to tilting of the platform. Current is supplied from the ceiling A through the trolley T to the switches 17, as for example through the wire or line 20 shown in Figure 5. In order to close the circuit to the motor 15, it is necessary that the operator press downwardly on both of the members 16. This provides an added safety feature, since the operator must have both feet firmly in position before the apparatus will start to move.

In connection with the propulsion of the rear wheel 5 of the cycle through the medium of the sprocket 8, chain 9 and sprocket 10 carried by spindle 11, it will be observed from Figure 5 that the sprocket 12 is frictionally connected with the spindle 11 through the medium of the friction disks 11a and 12a which are keyed or otherwise suitably connected with the spindle 11 and pressed against each other through the medium of the spring 12b. In other words, the sprocket wheel 12 is frictionally fitted or clamped between the members 11a and 12a by means of the spring 12b so that in the event the vehicle meets a temporary obstruction while the circuit is closed to the motor, the operation of the latter will do no harm or create no hazard due to the fact that the sprocket 12 will simply slip or slide until the vehicle has cleared the obstruction and the friction clutch again becomes operative so that motion transmitted to the sprocket wheel 12 from the motor may be again transmitted to the sprocket 8 of the drive rear wheel.

As will be observed from Figure 4, the sides of the opening 4a which accommodate the dirigible front wheel 4 may be provided with suitable roller abutments 4b so that when the front wheel 4 is turned to a sufficient angle to reach the sides of the opening, the sides of the tire or wheel will not become chafed or unduly worn.

From the foregoing, it will be apparent that the present vehicle includes a frame carrying a seat mounted at the upper side of a travelling platform and having associated therewith a rear driving wheel and a front steering wheel adapted to bear on the floor or other surface on which the vehicle rests, the said front wheel being connected by suitable forks with the handle-bars H disposed in convenient proximity to the saddle or seat G. Assuming that the switch D, Figure 2, is closed, and that the ceiling A and floor B are therefore electrically charged, the occupant of the saddle or seat G can cause the vehicle to move by pressing both feet downwardly on the foot rests 16. When the circuit to the motor is thus closed, the same will be propelled in the desired direction according to the angular position of the front wheel 4, the said back wheel being propelled through the motor 15 and driving connections previously referred to. When the vehicle meets an obstruction it is, of course, necessary for the operator to manipulate the front wheel 4 to extricate the vehicle and proceed on its way. In that connection, the type of bumper shown in Figures 1, 2 and 3 may be used, as desired, but is preferred to use vehicle bumpers of the type shown in Figures 6, 7 and 8.

Referring first to Figure 6, it will be observed that the platform 1 may be provided at one end with a relatively heavy arc-shaped rubber or equivalent bumper 22 which is held in position on the front or rear of the vehicle by means of a strap 21 whose exposed ends may be threaded to receive nuts for connecting with suitable brackets 23 on the under side of the platform. That is to say, the strap 21 may be molded in the rubber or other material forming the bumper 22 so that the entire bumper structure may be readily fitted to the under side of the platform. The bumper 22 is primarily intended for vehicle-to-vehicle collision, other means being provided to take care of the shock when the vehicle collides with the enclosure bumper B as shown in Figure 7.

In connection with Figure 7, it will be observed that the platform 1 is provided on its under side with a suitable depending bracket 24 carrying a horizontally disposed roller 25 disposed entirely below the rim 26 of the platform. These rollers 25 may be provided at suitable points along the under side edges of the platform 1 so that when the vehicle is thrust against one of the enclosure bumpers B', it will rebound with a glancing blow and send the vehicle back onto the floor without undue friction or delay.

In addition to using the roller type guard 25 described in Figure 7 and also shown in Figure 8, it may be observed from the latter figure that the under side of the platform may be provided with a depending abutment flange or guard rail 27 arranged at the end of the platform below one of the vehicle bumpers 22. As shown in the figure last referred to, the guard rail or flange 27 may engage with the enclosure bumper B' which is so positioned as to lie in a plane substantially below the lower normal limits of the platform or base. The bumper features referred to, contribute materially to the speeding up of the ride and prevent unnecessary "jams" likely to occur where the enclosure bumpers are located in substantially the same plane as the platform so that they may be engaged or struck by the bumper surrounding the platform or at the ends thereof and which is primarily intended for vehicle-to-vehicle collision.

Without further description, it is thought that the features and advantages of the invention will be readily apparent to those skilled in the art, and it will of course be understood that changes in the form, proportion and minor details of construction may be resorted to, without departing from the spirit of the invention and scope of the appended claims.

We claim:—

1. In an amusement apparatus of the class described, including an electrically charged floor and a ceiling, a vehicle comprising a platform having front and rear openings, metallic travellers carried by the under side of the platform, a bicycle frame mounted on the upper side of the platform and including a dirigible front wheel projecting through one of the openings of the platform and a rear traction wheel projecting through the other opening in the platform and both wheels adapted to engage the surface on which the vehicle travels, an electric motor mounted on the platform, means for connecting the motor with the rear traction wheel of the bicycle, and means including a trolley and foot operated switch means located on the platform at each side of the cycle frame adapted to selectively place the motor in circuit with the charged ceiling and floor.

2. An amusement car of the class described adapted to operate in an enclosure defined by bumper means, including a platform, vehicle bumper means fitted to an edge of the platform and in the plane thereof, and guard means projecting below the plane of the platform and adapted to engage said bumper means defining the enclosure in which the car operates.

3. An amusement car of the class described adapted to operate in an enclosure defined by bumper means, including a platform, vehicle bumper means fitted to an edge of the platform and in the plane thereof and disposed above said bumper means of the enclosure, and guard means projecting below the plane of the platform and including a roller adapted to engage with said bumper means defining the said enclosure.

4. In an amusement apparatus of the class described, including an electrically charged floor and ceiling, a vehicle comprising a platform having front and rear openings, travellers for supporting the platform at each side thereof, a bicycle frame including front and rear fork members having axles located above the platform, means for supporting the bicycle frame in a rigid upright position on the platform, a dirigible front wheel mounted on the axle of the front fork and projecting through the front opening, a relatively fixed traction wheel mounted on the axle of the rear fork and projecting through the rear opening and both wheels adapted to engage the floor on which the said travelers roll, an electric motor mounted on the platform and operatively connected with the rear traction wheel, a trolley carried by the rear of the platform for engaging said ceiling, and a controlling circuit including a switch connecting the trolley with the motor.

HAROLD STOEHRER.
FRED L. MARKEY.